United States Patent [19]

Moczygemba et al.

[11] 4,405,754

[45] Sep. 20, 1983

[54] HAZE-FREE, CLEAR, IMPACT-RESISTANT RESINOUS POLYMERS

[75] Inventors: George A. Moczygemba, Bartlesville, Okla.; Kishore Udipi, East Longmeadow, Mass.

[73] Assignee: Phillips Petroleum Company, Bartlesville, Okla.

[21] Appl. No.: 339,251

[22] Filed: Jan. 13, 1982

[51] Int. Cl.³ .................. C08L 25/10; C08L 9/06; C08L 53/02

[52] U.S. Cl. .................. 525/102; 525/194; 525/342; 525/386

[58] Field of Search ............... 525/102, 342, 386, 194

[56] References Cited

U.S. PATENT DOCUMENTS

| | | | |
|---|---|---|---|
| 3,244,664 | 4/1966 | Zelinski et al. | 524/525 |
| 3,281,383 | 10/1966 | Zelinski et al. | 525/122 |
| 3,627,745 | 12/1971 | Hsieh et al. | 526/84 |
| 3,639,517 | 2/1972 | Kitchen et al. | 525/92 |
| 3,639,519 | 2/1972 | Hsieh et al. | 525/153 |
| 3,645,947 | 2/1972 | Quigg et al. | 525/386 |
| 3,654,212 | 4/1972 | Wright | 524/198 |
| 3,661,873 | 5/1972 | Halasa et al. | 525/244 |
| 3,725,369 | 4/1973 | Halasa et al. | 525/254 |
| 3,725,370 | 4/1973 | Halasa et al. | 525/258 |
| 3,764,639 | 10/1973 | Hsieh et al. | 525/314 |
| 3,880,955 | 4/1975 | Hsieh et al. | 525/271 |
| 4,091,053 | 5/1978 | Kitchen | 525/98 |
| 4,174,360 | 11/1979 | Moczygemba | 525/338 |
| 4,180,530 | 12/1979 | Bi et al. | 525/98 |
| 4,221,884 | 9/1980 | Bi et al. | 525/314 |
| 4,248,980 | 2/1981 | Bi et al. | 525/271 |
| 4,248,981 | 2/1981 | Milkovich et al. | 525/271 |
| 4,248,982 | 2/1981 | Bi et al. | 525/271 |
| 4,248,983 | 2/1981 | Bi et al. | 525/314 |
| 4,304,886 | 12/1981 | Bean et al. | 525/386 |
| 4,308,364 | 12/1981 | Udipi | 525/386 |

OTHER PUBLICATIONS

Hall et al., J. Am. Chem. Soc. 80, Polymerization of Cyclic Ester, Urethans, Ureas and Imides.

*Primary Examiner*—Wilbert J. Briggs, Sr.

[57] ABSTRACT

Haze-free, clear, impact-resistant resinous copolymers are produced by coupling polymer-lithium with a mixture of coupling agents wherein one is a lactone such as butyrolactone and the other is a halo-silane such as phenyltrichlorosilane. The combination of coupling agents reduces haze, yet maintains clarity and impact resistance of the resulting coupled polymer.

17 Claims, No Drawings

HAZE-FREE, CLEAR, IMPACT-RESISTANT RESINOUS POLYMERS

FIELD OF THE INVENTION

The invention relates to haze-free, clear, impact-resistant resinous polymers. In another aspect, the invention relates to methods of producing haze-free, clear, impact-resistant polymers. In a further aspect, the invention pertains to a novel combination of coupling agents, effective in coupling polymer-alkali metal.

BACKGROUND OF THE INVENTION

A variety of coupling agents to couple polymer-alkali metal to produce a variety of higher molecular weight species have been employed in the past, such as silicon-containing materials as described in U.S. Pat. No. 3,244,664; polyfunctional agents such as described in U.S. Pat. No. 3,281,383; and lactones such as described in U.S. Pat. No. 3,627,745. Combinations of certain coupling agents have been described, such as divinylbenzene and a haloalkane in U.S. Pat. No.3,661,873; or combinations of silicic compounds and dialkenyl compounds in U.S. Pat. No. 3,725,369; or divinylbenzene and active halogen compounds in U.S. Pat. No. 3,725,370.

Nevertheless, improvements in coupling procedures and methods still are required, since in some instances problems continue to exist.

These problems have been particularly apparent in trying to make haze-free, clear, impact-resistant resinous polymers. Resinous copolymers are described in such as U.S. Pat. Nos. 3,639,517, and 4,091,053, both of these describing particular methods of initiator addition, as well as subsequent coupling procedures. Other patents also describe resinous impact-resistant copolymers such as U.S. Pat. Nos. 4,180,530, 4,221,884, 4,284,980, 4,248,981, 4,248,982, 4,248,983, all being star-shaped copolymers, and requiring a random diene/arene mid-block for radial arm, five of them employing a multiple initiator addition to produce a polymodal product, one being monomodal.

A problem arising in many coupling procedures has been the haze which develops in resinous coupled copolymers, since high clarity is exceedingly desirable, yet while maintaining impact-resistant characteristics of the resinous polymer. To produce a haze-free product, yet maintain the other physical properties, has indeed been a problem.

BRIEF SUMMARY OF THE INVENTION

We have discovered that the use of a combination of coupling agents of which one is a lactone and the other is a halo-silane produces efficient coupling, maintains the impact-resistance of resinous coupled copolymers, yet the copolymers are quite clear and very desirably highly haze-free.

Our technique while most preferably employed in coupling the resinous copolymers to produce haze-free clear impact products, nevertheless is effective and useful in coupling polymer-alkali metal generally, both resinous and elastomeric.

DETAILED DESCRIPTION OF THE INVENTION

In general, our invention is applicable to processes for the polymerization of conjugated dienes, or monovinylarenes, either alone, or at least one of each in admixture or sequentially, or some combination of such procedure such as polymerization of monovinylarene first followed by a conjugated diene second, or monovinylarene first followed by a mixture of additional monovinylarene plus conjugated diene, utilizing a single intial addition of hydrocarbyl alkali metal initiator, or dual initiator addition techniques whereby a portion of the initiator is added with a first charge of monovinylarene for example, followed by a second charge along with additional monovinylarene, and even a third charge with or without additional initiator, or by the addition of a portion of the initiator with an initial charge of monovinylarene, and further initiator at the time the conjugated diene or mixture of monovinylarene/conjugated diene is further added. Such polymerizations are conducted in solution employing a hydrocarbon diluent, and any of the alkali metal-based initiators as practiced in the art, and where desired an agent such as tetrahydrofuran or other polar compound for radomization.

Subsequent to the polymerization of all of the monomer or monomers, and prior to the addition of any other agent which would terminate the resulting polymer-alkali metal, two types of coupling agents then are added in accordance with our invention. At least one first coupling agent which is a lactone, and at least one second coupling agent which is a halo-silane, are added, either in admixture or substantially simultaneously individually, to the polymer-alkali metal in solution. Usually we prefer to add the two types substantially simultaneously.

The resulting product is a mixture of coupled species depending on the functionality of each of the respective coupling agents employed. The product may represent substantially a linear admixture of coupled species, or mixture of linear and radial, or substantially radial. And, depending upon the relative proportions of conjugated diene/monovinylarene, the product will be elastomeric or resinous. Particularly desirable in the case of the impact resistant resinous plastics which are basically clear, our combination of coupling agents provides not only a clear colorless, but also substantially haze-free product, without yellowish tendencies which otherwise frequently are encountered in attempting to provide such clear impact resistant resins particularly useful for bottling and decorative purposes.

Any desired effective coupling amount of the combination of first and second coupling agents can be employed. The amount is not believed to be particularly critical. However, at least a stoichiometric amount relative to the active polymer-alkali metal tends to promote maximum coupling as a generality, though it may be desired to employ up to such as about a 20 percent mole excess for maximum coupling with the mixture including the lactone. However, less can be used, even less than stoichiometric amounts, for lesser degrees of coupling where desired for particular products of broadened molecular weight distributions. Smaller less-than-stoichiometric amounts tend to promote the formation of coupled species of various molecular weights, sometimes desired for improved processability of polymers of conjugated dienes.

Typically, the total amount of coupling agent, including the first coupling agent of the lactone type, and the second coupling agent of the halo-silane type, together, usually will be in the range of about 0.2 to 20 mhm (gram millimoles per 100 grams of total monomers employed in the polymerization), presently preferably about 1 to 5 (depending on the amount of metal-based initiator used). The mole ratio of first coupling agent-:second coupling agent should be in the range of about 1:5 to 20:1, more preferably about 1:1 to 5:1, presently most preferably it is believed that maximum effectiveness in not only the coupling benefits, but in haze avoidance is obtained by using a mole ratio of about 3:1.

Halo-Silanes

The term halo-silane is intended to include the silicon halides, silanes, disilanes, such that each halo-silane contains at least two halogen atoms. Suitable agents can be represented by the general formula $R_aSiX_b$ in which R is a hydocarbyl radical, preferably alkyl, cycloalkyl, aryl, or combination thereof, of 1 to 20 carbon atoms; Si is silicon; x is halogen which can be fluorine, chorine, bromine, or iodine. The integer indicators are such that a is 0, 1, or 2; b is an integer of 2, 3, or 4; such that the sum of a plus b is 4.

The disilanes can be represented by the general formula $R_aX_dSiSiX_dR_a$, in which R, X, and a are as defined above; and d is an integer of 1, 2, or 3; with the sum of a plus d equal to 3.

Examples of these types of coupling agents, illustrative but not limitative, include such as silicon tetrahalide, dimethyldichlorosilane, methyltrichlorosilane, trichlorosilane, methyldichlorosilane, phenyltrichlorosilane, and the like. The disilane agents include typically such as hexahalo-disilanes, such as hexachlorodisilane, and any of the other disilanes including at least two halogens as described. Most generally employed because of ease of handling and cost considerations, is silicon tetrachloride.

Lactone Coupling Agent Component

The lactone which can be employed in accordance with our invention as one of the components in the dual terminating/coupling system can be represented by the general formula:

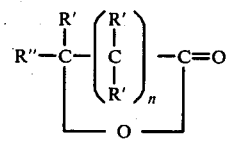

in which R" is hydrogen, or the same as radical R' or a radical of the formula

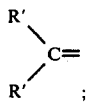

R' is hydrogen, alkyl, cycloalkyl, alkenyl, cycloalkenyl, aryl radicals and combinations thereof, n is an integer of 1, 2, 3, 4, or 5; and, the total carbon atoms in the R' and R" substituents is in the range of 1 to 12. When R" is the specified radical, no R' is attached to the carbon atom to which the specified radical is attached.

Lactones which can be employed include typically such as β-propiolactone, γ-butyrolactone, δ-valerolactone ε-caprolactone, and lactones corresponding to acids such as 2-methyl-3-hydroxypropionic acid, 3-benzyl-3-hydroxypropionic acid,
3-(3,5-diethylcyclohexyl)-5-ethyl-6-hydroxycaproic acid, and
2,2-dimethyl-4-propenyl-3-hydroxy-3,5-heptadienoic acid.

Polymerization Process

In general, our invention is applicable to processes for the polymerization of conjugated dienes, or monovinylarenes, or both in the presence of a diluent employing an alkali metal-based initiator.

The conjugated dienes ordinarily contain 4 to 12 carbon atoms per molecule, and those containing from 4 to 8 carbon atoms are preferred for availability. Such monomers include 1,3-butadiene, isoprene, 2,3-dimethyl-1,3-butadiene, piperylene, 3-butyl-1,3-octadiene, 2-phenyl-1,3-butadiene, and the like. The monovinylarenes ordinarily contain 8 to 20, more conveniently 8 to 12, carbon atoms per molecule, including such as styrene, α-methylstyrene, 1-vinylnaphthalene, 2-vinylnaphthalene, and the alkyl, cycloalkyl, aryl, alkaryl, and aralkyl derivatives thereof in which the total number of carbon atoms in the combined substituents generally is not greater than 12. Examples of substituted monomers include 3-methylstyrene, 4-n-propylstyrene, 4-cyclohexylstyrene, 4-dodecylstyrene, 3-ethyl-4-benzylstyrene, 4-p-tolylstyrene 4-(4-phenyl-n-butyl)styrene, and the like. Any of the conjugated dienes and/or the monovinylarenes can be polymerized alone, or in admixture, or sequentially, to form homopolymers or random or block copolymers. The weight ratio of conjugated diene:monovinylarene monomers in copolymerizations can range from about 95:5 to 1:99.

The solution process polymerization as is known in the art usually is carried out at a temperature in the range between about −100° to 150° C., more usually about 0° to 110° C., and at a pressure sufficient to maintain the reaction mixture substantially as a liquid, in the presence of a diluent. Suitable diluents include, for example, paraffins, cycloparaffins, and aromatic hydrocarbons, of such as 4 to 10 carbon atoms per molecule. Examples include pentane, hexane, cyclopentane, cyclohexane, isooctane, benzene, toluene, and mixtures. As is known, small amounts of polar compounds can be included in the diluent for vinyl control in diene polymers, or to improve effectiveness of some initiators for monovinylarene polymerizations, and the like.

The initiators can be any of the alkali metals or organoalkali metal compound known for such purposes. Preferably, the organoalkali metal compounds correspond to the general formula $RM_x$, in which R is a hydrocarbyl aliphatic, cycloaliphatic, or aromatic radicals, and x is an integer of 1 to 4 inclusive, and M is an alkali metal, preferably lithium. The amount of alkali metal-based initiator employed depends upon the desired polymer molecular weight, and can range from about 0.1 to 40 gram milliequivalents per 100 grams of monomers. The polymerization is conducted in the substantial absence of air or moisture, preferably in an inert atmosphere. The resulting polymers contain a very high percentage of molecules in which an alkalie metal atom is positioned at the end or ends of the polymer chains, although any traces of impurities present, such as water or alcohol, tend to reduce the amount of alkali metal-terminated polymer formed.

Our invention particularly is applicable to resinous thermoplastic block polymers of either linear or radially branched types, and in which the arms of each branch are either composed as substantially pure homopolymeric blocks of polymonovinylarene represented by A and polyconjugated diene represented by B, such that the polymer would be represented by A—B—x—B—A in the case of linear polymer and x representing the coupling agents residue, or in which the block of polyconjugated diene can be a random block which can be represented by A/B or B/A indicating either purely random or a tapered random block. Most preferably, these products are formed by means of a multiple addition of initiator.

Preferably, the process of polymerization involves a polymerization process in which non-elastomeric (resinous) blocks of polymer are first formed. The resinous portion of the block polymer is formed by charging a substantial portion of the total amount of monovinyl-substituted aromatic hydrocarbon monomer employed to a polymerization vessel and contacting said monomer with a relatively small amount of organolithium initiator and maintaining polymerization conditions for a period of time sufficient to convert essentially all of the monomer and the initiator to relatively long non-elastomeric chains of living polymer having active terminal lithium atoms.

The remainder of the total monovinyl-substituted aromatic hydrocarbon monomer employed is then charged in one or more increments, to said polymerization vessel containing the polymerization reaction product of the first charge such that each incremental charge of monomer is accompanied by a corresponding incremental charge of initiator so that a relatively large amount of initiator is employed per amount of monomer. The polymerization conditions are maintained and after each incremental charge of monomer and initiator a sufficient time is allowed to convert essentially all of the newly added monomer and initiator to non-elastomeric chains of living polymer.

After the non-elastomer polymer fraction has been prepared, the chains of non-elastomeric living polymer are contacted with conjugated diene monomer which is charged to the polymerization vessel and the reaction mixture is allowed to polymerize again to essential completion to form chains of living copolymer containing both elastomeric and non-elastomeric blocks.

In another technique, the amount of initiator added with each portion of monovinylarene is substantially equal. Such techniques are taught in such as U.S. Pat. No. 3,639,517, the disclosure of which is hereby incorporated in total.

In another mode, in the first stage, 80 to 95 percent by weight of the total amount of monovinyl aromatic compound is polymerized in an inert solvent using a hydrocarbyllithium initiator to form linear segments (A—Li), of the monovinyl aromatic compound having lithium ions at the ends. The polymerization is allowed to proceed to essential completion.

In the second stage, an additional amount of the hydrocarbyllithium initiator, equal to or greater than the amount added in the first stage, is added to the mixture from stage one, the remainder of the monovinyl aromatic compound is added, and 60 to 80 percent by weight of the total amount of the conjugated diene is continuously added at a rate, determined by the amounts of total monomer and the relative copolymerization rates of the monovinyl aromatic compound and the conjugated diene, such that an essentially random copolymer segment, B/A'—Li, is formed. Simultaneously with the formation of the B/A'—Li segments, the A—Li segments from stage two will form A—B-/A'—Li segments.

The second stage may also be carried out by other known means of preparing styrene/butadiene type random copolymers. For example, after the additional amount of initiator is added to the mixture from stage one, a mixture of the remaining monovinyl aromatic compound and 60 to 80 percent by weight of the total amount of conjugated diene can be added continuously to the reaction mixture at a rate such that an essentially random copolymer block is formed. Methods are also known for producing random copolymer blocks using as randomizer a polar compound, such as the tertiary amines, thioethers, or cyclic ethers.

In the third stage, the remaining 20–40 percent by weight of conjugated diene is added to the segments from stage two and allowed to polymerize to essentially complete conversion to form a polydiene block segment on each of the previously formed segments. Thus, the mixture now contains A—B/A'—B'—Li and B/A'—B'—Li segments. Alternatively, in the second stage, the additional addition of the lithium initiator can be omitted, in which case the product is monomodal rather than polymodal. Variations of such techniques can be employed, of course, as will be recognized by one skilled in the art.

Coupling Reaction

The lactone and halo-silane coupling agents can be introduced into the polymerization reaction mixture in any suitable and convenient manner. They can be added individually (first the lactone, then immediately thereafter the halo-silane) or in admixture. They can be added to the polymerization mixture at any time during or after the polymerization reaction. They can be added in small quantities either intermittently or continuously during the course of the reaction. Typically they are added following completion of the monomer polymerization. For effective coupling, the combination of lactone and halo-silane must be added before any material such as water, acid, alcohol, antioxidant, or carbon dioxide is added to inactivate and/or remove the lithium or other alkali metal atoms attached to the terminal monomer units or units of the polymer chain. The temperature suitable for conducting the coupling reaction, i.e. reaction of polymer-lithium with the combination of lactone and halo-silane can vary over a broad range and conveniently is the same temperature used for the polymerization of the monomers. The time for conducting the coupling reaction can be as convenient, such as up to 24 hours, preferably about 10 seconds to 10 minutes. The pressure employed for the coupling reaction can be below or above atmospheric and preferably and conveniently is the autogenous pressure.

Polymer Recovery

Following completion of the coupling reaction, the coupled polymer is treated to remove any remaining lithium from the polymer. Suitable treating agents include lower alcohols, mineral acids, water, antioxidant, and carbon dioxide, alone or in combination. Preferably, for resinous copolymers, an aqueous solution of carbon dioxide is used for termination. The now lithium-free polymer can be isolated by typical procedures, such as solvent flashing, coagulation using a non-solvent for the polymer such as isopropyl alcohol, or steam stripping.

EXAMPLES

Examples following are intended to further illustrate our invention. However, particular materials employed, monomers, relationships, reaction conditions, species, and the like, should be considered exemplary, and not limitative of the reasonable scope of our invention as herein disclosed and claimed.

EXAMPLE 1

This example illustrates the preparation of polymodal, resinous butadiene/styrene copolymers, in accordance with the procedure broadly described in U.S. Pat. Nos. 3,639,517 and 4,091,053, utilizing a combination of a lactone and a chlorosilane as the polyfunctional coupling agent.

1.2 lb. of cyclohexane and 0.1 gram of tetrahydrofuran (THF dissolved in 1 cc of cyclohexane) were charged to a jacketed, stirred reactor of 3 liter capacity. The mixture was heated to about 60 degrees C. (at a pressure of 25 psi). Then 29 gms of a solution containing 2.13 wt% n-butyllithium plus 0.2 lb. of cyclohexane, and subsequently 159 grams of styrene plus 0.1 lb. of cyclohexane were charged. The reaction mixture was allowed to polymerize for 20 minutes (peak temperature: 77 degreees C.). Then the second portion of styrene (159 grams of styrene plus 0.1 lb. of cyclohexane) was charged, and the polymerization reaction continued for 20 minutes (peak temperature: 83 degrees C., peak pressure: 90 psi). Subsequently, 101 grams of butadiene plus 0.2 lb. of cyclohexane were introduced and allowed to react with live styrene-Li polymer chains for 25 minutes.

After a reactor temperature of 96 degrees C. was attained, 4.8 cc of a 1-molar ε-caprolactone solution and immediately thereafter 3.0 cc of a 0.47 molar phenyl-trichlorosilane solution were added, followed by flushing with 0.2 lb of cyclohexane. The reactor mixture was terminated after 7 minutes with 2 cc of water and 50 psi $CO_2$. Finally 16 cc of a stabilizer solution was added so as to provide 1.0 parts per 100 parts of monomer (phm) tris (nonyltriphenyl) phosphite (TNTP) and 0.5 phm 2,6-di-t-butyl-p-cresol (BHT). The resin was recovered by flashing off the solvent.

EXAMPLE II

Three additional resinous, polymodal butadiene/styrene copolymers were prepared in accordance with the general procedure outlined in Example I. The most pertinent reaction conditions and properties of these three polymers plus the one described in Example I are listed in Table I.

TABLE I

Polymerization Conditions and Polymer Properties

|  | Run 1 (Invention) | Run 2 (Invention) | Run 3 (Control) | Run 4 (Control) |
| --- | --- | --- | --- | --- |
| Styrene (parts by weight), 1st addition | 38 | 38 | 38 | 38 |
| n-Butyllithium (mhm)[a] | 2.30 | 4.29 | 2.30 | 4.29 |
| Styrene (parts by weight), 2nd addition | 38 | 38 | 38 | 38 |
| Butadiene (parts by weight) | 24 | 24 | 24 | 24 |
| Caprolactone (mhm)[a] | 1.15 | 2.15 | 0 | 0 |
| Phenyltrichlorosilane (mhm)[a] | 0.34 | 0.68 | 1.4 | 2.9 |
| $M_n \times 10^{-3}$[b], before coupling | 59 | 21.7 | 47 | — |
| $M_n \times 10^{-3}$[b], coupled polymer | 101 | 37 | 106 | — |
| $M_w \times 10^{-3}$[b], coupled polymer | 139 | 51 | 144 | — |
| Heterogeneity Index[c], coupled polymer | 1.38 | 1.38 | 1.36 | — |
| Inherent Viscosity[d], coupled polymer | 0.65 | 0.39 | 0.67 | — |
| Gel Content[e], coupled polymer | 0 | 0 | 0 | — |
| Melt Flow[f], coupled polymer | 7.7 | 75.3 | 8.4 | — |

[a]mhm = gram millimoles per 100 grams of total monomer.

[b]Molecular weights were determined from gel permeation chromatography curves by a procedure described by G. Kraus and C. J. Stacy, J. Poly. Sci. A-2 10, 657 (1972) and J. Poly. Sci. Symposium No. 43, 329 (1973).

[c]Heterogeneity Index = $M_w/M_n$. The higher the heterogeneity index, the broader the molecular weight distribution.

[d]Inherent viscosity was determined according to the procedure given in U.S. Pat. No. 3,278,508, Column 20, Note a with the modification that the solution was filtered through a glass filter stick of grade C porosity and pressured directly into the viscometer.

[e]Determination of gel was made by immersing an empty wire cage into a toluene solution used for inherent viscosity determination, withdrawing it after 24 hours and weighing it. The cage was calibrated by repeating the procedure for pure toluene. The weight of the dry gel was determined from the difference of the two cage weights.

[f]Melt flow is given in grams/10 minutes and is determined according to ASTM D 1238, Condition G, at 200 degrees C., with a 5 Kg weight.

EXAMPLE III

The four resinous polymodal butadiene/styrene copolymers described in Example II were blended with a commercially prepared resinous, polymodal butadiene/styrene copolymer (KR03 K-Resin ® resin), which was coupled with Admex-711, an epoxidized soybean oil. This blending was necessary because control polymers (especially the polymer produced in Run 4) were quite opaque, and their haziness could not be accurately determined without dilution with an essentially clear resin.

Blending was carried out by dissolving in 2.3 lb of cyclohexane, 400 grams of commercial, Admex-711 coupled KR03 K-Resin ® copolymer and 100 grams of polymers obtained in Runs 1,2,3,4. After purging with nitrogen gas, the solvent was flashed off, and the polymer blend was dried and comminuted. Properties of polymer blends are listed in Table II. Data clearly show that polymers coupled with caprolactone and phenyltrichlorosilane were considerably less hazy than those coupled with only phenyl-trichlorosilane. Physical properties compared favorably with those of commercial K-Resin ® resins.

TABLE II

Properties of Resinous, Polymodal Butadiene/Styrene Copolymer Blends

| Polymer Blend Sample | 1 (Invention) | 2 (Invention) | 3 (Control) | 4 (control) | 5[a] (Commercial) | 6[b] (Commercial) |
|---|---|---|---|---|---|---|
| Weight-% of Experimental Polymer | 20 | 20 | 20 | 20 | 0 | 0 |
| Weight-% of Commercial Polymer | 80 | 80 | 80 | 80 | 100 | 100 |
| Coupling Agents of Experimental Polymer | Caprolactone +Phenyl-SiCl$_3$ | Caprolactone +Phenyl-SiCl$_3$ | Phenyl—SiCl$_3$ | Phenyl—SiCl$_3$ | — | — |
| Flexural Modulus, MPa[c] | 1737 | 1681 | 1656 | 1681 | 1692 | 1689 |
| Tensile Yield Strength, MPa[d] | 32.4 | 32.9 | 32.1 | 32.8 | 31.7 | 32.0 |
| Tensile Break Strength, MPa[d] | 32.7 | 30.2 | 31.0 | 31.8 | 30.6 | 30.6 |
| Elongation, %[d] | 192 | 231 | 192 | 230 | 203 | 226 |
| Hardness, Shoe D[e] | 72 | 72 | 72 | 73 | 70 | 70 |
| Izod Impact, Notched, J/M[f] | 18.3 | 15.4 | 18.3 | 18.5 | 18.3 | 18.6 |
| Izod Impact, Unnotched, J/M | 229 | 213 | 318 | 257 | 241 | 234 |
| Gardner Impact, Cm Kg/mm | 80 | 48 | 81 | 62 | 81 | 65 |
| Haze, % | 3.5 | 4.8 | 16.8 | 50.1 | 8.2 | 3.6 |

[a] a commercial resinous, polymodal butadiene/styrene K-Resin ® (KR03) polymer coupled with Admex-711 (an epoxidized soybean oils); M = 119,000; M$_n$ = 86,000
[b] a commercial resinous, polymodal butadiene/styrene K-Resin ® (KR03) polymer coupled with Admex-711; M$_w$ = 53,000; M$_n$ = 42,000.
[c] determined according to ASTM D790
[d] determined according to ASTM D 638
[e] determined according to ASTM D2240
[f] determined according to ASTM D256
[g] determined according to Instruction Manual IG-1120 of Gardner Laboratories, with a 4 lb-weight
[h] determined according to ASTM 1003; 50 mil thickness of test specimen; using a Gardner hazemeter.

Polymers produced in accordance with the process of this invention have general applicability as is known for elastomeric and resinous polymers. These uses include such as shoe soles, various wire coating, containers, and the like. Most particularly, the resinous polymers are most desirably used for clear impact resistant resin applications, and most importantly our haze-free clear impact resistant resinous copolymers produced in accordance with our invention find greatest application.

Most preferred are the polymers prepared in accordance with this invention which are polymodal, resinous, linear or radial branched block copolymers which contain about 70 to 95 weight percent copolymerized monovinylarene based on the weight of total monomers employed, the balance being conjugated diene. The polymers of this invention when formed into articles not only exhibit surprising and outstanding properties such as high impact strength and high environmental stress crack resistance, but are transparent as well, colorless, yellow-free, and haze-free.

The disclosure, including data, illustrate the value and effectiveness of our invention. The Examples, the knowledge and background of the field of the invention, as well as the general principles of chemistry and other applicable sciences, have formed the bases to which the broad description of the invention including the range of conditions and generic groups of operate components have been developed, and further formed bases for our claims here appended.

We claim:

1. In a process of coupling an alkali metal-terminated polymer derived from the solution polymerization of at least one conjugated diene, monovinylarene, or both, the improvement which comprises employing an effective amount of coupling agents comprising at least one lactone and at least one halosilane wherein said halosilane contains at least two halogen atoms per molecule; and wherein the total amount of said coupling agents is in the range of about 0.2 to 20 mhm, and the mole ratio of lactone:halosilane is in the range of about 1:5 to 20:1.

2. The process according to claim 1 wherein said lactone is represented by the general formula

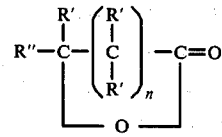

wherein R' is selected from hydrogen, alkyl, cycloalkyl, alkenyl, cycloalkenyl, aryl, or combination radical; R'' is hydrogen, R', or

n is an integer of 1, 2, 3, 4, or 5; and the total carbon atoms in R' and R'' together in the range of 1 to 12.

3. The process according to claim 1 wherein said halosilane is selected from silicon halides, silanes, and disilanes.

4. The process according to claim 1 wherein said lactone is selected from the group consisting of β-propiolactone, γ-butyrolactone, δ-valerolactone, ε-caprolactone, and lactones corresponding to the acids 2-methyl-3-hydroxypropionic acid, 3-benzyl-3-hydroxypropionic acid, 3-(3,5-diethylcyclohexyl)-5-ethyl-6-hydroxycaproic acid, and 2,2-dimethyl-4-propenyl-3-hydroxy-3,5-heptadienoic acid.

5. The process according to claim 3 wherein said halosilane is selected from the group consisting of silicon tetrahalide, dimethyldichlorosilane, methyltrichlorosilane, trichlorosilane, methyldichlorosilane, phenyltrichlorosilane, hexachlorodisilane, and silicon tetrachloride.

6. The process according to claim 5 employing a total of coupling agents in the range of about 1 to 5 mhm, and said mole ratio is in the range of about 1:1 to 5:1.

7. The process according to claim 6 employing a mole ratio of about 3:1.

8. The process according to claim 6 wherein said conjugated diene is selected from the group consisting of 1,3-butadiene, isoprene, 2,3-dimethyl-1,3-butadiene, piperylene, 3-butyl-1,3-octadiene, and 2-phenyl-1,3-butadiene.

9. The process according to claim 8 wherein said monovinylarene is selected from the group consisting of α-methylstyrene, 1-vinylnaphthalene, 2-vinylnaphthalene, 3-methylstyrene, 4-n-propylstyrene, 4-cyclohexylstyrene, 4-dodecylstyrene, 3-ethyl-4-benzylstyrene, 4-p-tolylstyrene, and 4-(4-phenyl-n-butyl)styrene.

10. The process according to claim 9 wherein said polymerization employs both a conjugated diene and a monovinylarene, and the resulting product is a resinous copolymer.

11. The process according to claim 1, 6, 7, 8, 9, or 10, wherein said coupling agents are ε-caprolactone and phenyltrichlorosilane.

12. In a process of coupling an alkali metal-terminated polymodal resinous copolymer derived from the solution polymerization of at least one conjugated diene and at least one monovinylarene, the improvement which comprises employing coupling agents comprising at least one lactone and at least one halosilane wherein said halosilane contains at least two halogen atoms per molecule; and wherein the amount of said combination is in the range of about 0.2 to 20 mhm;

wherein said lactone is represented by the general formula

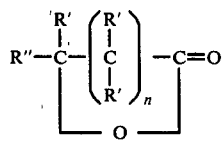

wherein R' is selected from hydrogen, alkyl, cycloalkyl, alkenyl, cycloalkenyl, aryl, or combination radical; R" is hydrogen, R', or

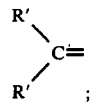

n is an integer of 1, 2, 3, 4, or 5; and the total carbon atoms in R' and R" together in the range of 1 and 12; and wherein said halosilane is selected from silicon halides, silanes, and disilane.

13. The process according to claim 12 wherein said lactone is selected from the group consisting of β-propiolactone, γ-butyrolactone, δ-valerolactone, ε-caprolactone, and lactones corresponding to the acids 2-methyl-3-hydroxypropionic acid, 3-benzyl-3-hydroxypropionic acid, 3-(3,5-diethylcyclohexyl)-5-ethyl-6-hydroxycaproic acid, and 2,2-dimethyl-4-propenyl-3-hydroxy-3,5-heptadienoic acid; and wherein said halosilane is selected from the group consisting of silicon tetrahalide, dimethyldichlorosilane, methyltrichlorosilane, trichlorosilane, methyldichlorosilane, phenyltrichlorosilane, hexachlorodisilane, and silicon tetrachloride.

14. The process according to claim 13 employing a mole ratio of lactone:halosilane in the range of about 1:5 to 20:1.

15. The process according to claim 14 employing a total of said coupling agents in the range of about 1 to 5 mhm, and said mole ratio is in the range of about 1:1 to 5:1.

16. The process according to claim 15 wherein said conjugated diene is selected from the group consisting of 1,3-butadiene, isoprene, 2,3-dimethyl-1,3-butadiene, piperylene, 3-butyl-1,3-octadiene, and 2-phenyl-1,3-butadiene; and wherein said monovinylarene is selected from the group consisting of α-methylstyrene, 1-vinylnaphthalene, 2-vinylnaphthalene, 3-methylstyrene, 4-n-propylstyrene, 4-cyclohexylstyrene, 4-dodecylstyrene, 3-ethyl-4-benzylstyrene, 4-p-tolylstyrene, and 4-(4-phenyl-n-butyl)styrene.

17. The process according to claim 16 wherein said conjugated diene is butadiene, said monovinylarene is styrene; and wherein said coupling agents are ε-caprolactone and phenyltrichlorosilane employing a mole ratio of about 3:1.

* * * * *